United States Patent
Khouri et al.

(10) Patent No.: US 8,218,753 B2
(45) Date of Patent: Jul. 10, 2012

(54) PROCESSING MULTI-PARTY CALLS IN A CONTACT CENTER

(75) Inventors: Joseph Khouri, San Jose, CA (US);
Mukul Jain, San Jose, CA (US);
Laurent Philonenko, San Francisco, CA (US); Sanjeev Kumar, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 1114 days.

(21) Appl. No.: 12/107,525

(22) Filed: Apr. 22, 2008

(65) Prior Publication Data
US 2009/0262914 A1  Oct. 22, 2009

(51) Int. Cl.
H04M 3/00 (2006.01)
H04M 5/00 (2006.01)
H04M 3/42 (2006.01)
H04M 1/56 (2006.01)
H04M 15/06 (2006.01)

(52) U.S. Cl. ......... 379/265.01; 379/265.02; 379/265.11; 379/202.01; 379/142.01; 379/142.04; 379/142.06

(58) Field of Classification Search ............. 379/265.01, 379/265.02, 265.11, 265.13, 142.01, 142.04, 379/142.06, 202.01
See application file for complete search history.

(56) References Cited

U.S. PATENT DOCUMENTS
2002/0089938 A1 7/2002 Perry
2007/0064906 A1 3/2007 Jain

OTHER PUBLICATIONS
Cisco. Cisco Call Manager Version 4.1. Published by Cisco [online]. 2004 [retrieved on Sep. 29, 2008]. pp. 1-18. Retrieved from the Internet: <URL: http://www.cisco.com/en/US/prod/collateral/voicesw/ps6788/vcallcon/ps556/product_data_sheet0900aecd801979f0.pdf>. San Jose, California, USA.
Welcher, Peter J., "Next Hop Resolution Protocol," published by Chesapeake NetCraftsmen (Arnold, MD, US), Dec. 1997, 7 pages

*Primary Examiner* — Ahmad Matar
*Assistant Examiner* — Nafiz E Hoque
(74) *Attorney, Agent, or Firm* — Hickman Palermo Truong Becker Bingham Wong LLP (57) ABSTRACT

A data processing apparatus is configured for receiving a call comprising multiple callers who are identified in a multi-party caller identification value that is received with the call; retrieving from a database, based on the multi-party caller identification value, information about each of the multiple callers; based on the retrieved information and a collective importance algorithm, determining or selecting one or more call treatment attributes for the call; and processing the call using the one or more call treatment attributes that are determined or selected. For example, a contact center or call center can provide differentiated services based on collective attributes or profiles, or a weighted average priority, of multiple people who are calling together, rather than only taking into account information about a single calling party. Call processing attributes such as priority, queuing, routing, and screen pop-up content, may be selected based on collective data about multiple callers.

27 Claims, 8 Drawing Sheets

PROCESSING MULTI-PARTY CALLS IN A CONTACT CENTER

CROSS-REFERENCE TO RELATED APPLICATIONS

This application is related to prior application Ser. No. 11/906,275 filed Oct. 1, 2007.

TECHNICAL FIELD

The present disclosure generally relates to the field of telephony; more particularly, caller identification (ID) systems for telephony networks.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Caller ID is a common service offered by most telephone companies which determines and communicates the number/name of the calling party of an incoming call. Many modern telephone and telephony systems routinely offer this service, which is also known as Automatic Number Identification (ANI). Today, many communication systems provide messaging and conferencing services via packetbased networks, i.e., those that operate in accordance with the Internet Protocol (IP).

Telephone call contact centers, such as customer service centers, typically assume that an inbound call or a customer interaction involves a single person identified by the caller's caller ID number. Treatment of the call in the contact center, including priority, queuing, routing, and screen displays or "pops" assumes that a single person is calling. Contact centers do not have an effective way to adjust the treatment of a call when a call or interaction involves multiple people at the same time.

DETAILED DESCRIPTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:
  1.0 General Overview
  2.0 Identification of Multiple Persons on a Phone Call
  3.0 Treatment of Multi-Party Calls in a Contact Center
    3.1 Determining Call Treatment Attributes Based on a Multi-Party Caller Identification Value
    3.2 Determining a Collective Profile
    3.3 Generating Visual Displays with Collective Information
    3.4 Updating Call Treatment Attributes Based on Mid-Call Updates
  4.0 Extensions and Alternatives
  1.0 General Overview In an embodiment, a data processing apparatus is configured for receiving a call comprising multiple callers who are identified in a multi-party caller identification value that is received with the call; retrieving from a database, based on the multi-party caller identification value, information about each of the multiple callers; based on the retrieved information and a collective importance algorithm, determining or selecting one or more call treatment attributes for the call; and processing the call using the one or more call treatment attributes that are determined or selected.

In an embodiment, the apparatus further comprises sequences of instructions which, when executed by the processor, cause the processor to perform determining two or more individual caller identification values that are included in the multi-party caller identification value, wherein each of the individual caller identification values is uniquely associated with one of the multiple callers.

In an embodiment, the sequences of instructions cause the processor to perform determining or selecting a collective priority value for the call, selecting a particular queue for the call based on the call treatment attributes, routing the call to a particular call handling agent based on the call treatment attributes, or generating one or more screen display content elements based on the call treatment attributes.

In an embodiment, the apparatus further comprises sequences of instructions which, when executed by the processor, cause the processor to perform retrieving a plurality of individual caller profiles from the database for the multiple callers, creating and storing a collective profile based on the plurality of individual caller profiles, and determining, selecting or modifying one or more of the call treatment attributes based on the collective profile.

In an embodiment, the call treatment attributes comprise any of a call routing, a selected call handling agent, content of one or more screen displays, and data for populating one or more forms.

In an embodiment, the apparatus further comprises sequences of instructions which, when executed by the processor, cause the processor to perform generating and displaying one or more visual displays that include one or more content elements that are based on the collective profile.

In an embodiment, the apparatus further comprises sequences of instructions which, when executed by the processor, cause the processor to perform receiving, during the call, an updated multi-party caller identification value; retrieving from the database, based on the updated multi-party caller identification value, updated information about each of the multiple callers; based on the retrieved updated information and the collective importance algorithm, determining or selecting one or more updated call treatment attributes for the call; processing the call using the one or more updated call treatment attributes that are determined or selected.

Using the techniques herein, for example, a contact center or call center can provide differentiated services based on collective attributes or profiles, or a weighted average priority, of multiple people who are calling together, rather than only taking into account information about a single calling party. Call processing attributes such as priority, queuing, routing, and screen pop-up content, may be selected based on collective data about multiple callers.

In other embodiments, the invention encompasses a computer-implemented method and a computer-readable medium configured to carry out the foregoing steps. Many other features and aspects will become apparent from the following description and claims.

2.0 Identification of Multiple Persons on a Phone Call

In the context of the present application, a communication network is a geographically distributed collection of interconnected subnetworks for transporting data between nodes, such as intermediate nodes and end nodes (also referred to as endpoints). A local area network (LAN) is an example of such a subnetwork; a plurality of LANs may be further interconnected by an intermediate network node, such as a router, bridge, or switch, to extend the effective "size" of the computer network and increase the number of communicating nodes. Examples of the endpoint devices or nodes may include servers, VoIP phones, Session Initiation Protocol (SIP) phones, video conferencing units, video terminals, Personal Digital Assistants (PDAs), and personal computers. The nodes typically communicate by exchanging discrete frames or packets of data according to predefined protocols.

A communication or conferencing system, as those terms are used herein, both comprise software and/or hardware (including firmware) components integrated so as to facilitate the live exchange of voice and, in certain implementations, other information (audio, video and/or data) among persons participating via endpoint devices at different remote locations. A call or conference session may involve point-to-point or multipoint calls over a variety of network connections and protocol types.

An endpoint is a device that provides media communications termination to an end user, client, or person who is capable of participating in a telephony call or in an audio conference session via a communication system. Endpoint devices that may be used to initiate or participate in a call or conference session include a mobile phone, a personal digital assistant (PDA), a voice over Internet protocol (VoIP) phone, a personal computer (PC), such as notebook, laptop, or desktop computer; an audio/video appliance; or any other device, component, element, or object capable of initiating or participating in audio exchanges with a telephony or conferencing system.

According to one embodiment, a mechanism is provided that communicates to a called party the caller IDs (e.g., names/numbers) of multiple persons participating or listening in on call placed from a single phone or endpoint device. In various embodiments described herein, a Graphical User Interface (GUI)/Telephony User Interface (TUI) may be utilized on a caller endpoint device for adding multiple callers to a call with proper authentication and authorization.

In accordance with a specific embodiment, a new GUI button (e.g., "Add Caller") is displayed when the phone handset is lifted off hook. The GUI button may be implemented as either a soft key on the phone UI or a hardware button. Upon pressing the "Add Caller" button the user is prompted to enter new caller ID information to be associated with the current call. At this point the user can either enter his user ID and password combination, or the phone number and personal identification number (PIN) for his caller ID to be associated with the call. The information collected from the above steps is then sent to an Authentication Authorization Accounting (AAA) server.

Upon confirmation from the AAA server, which includes the standard formatted caller ID information, the phone device associates the additional caller ID of the user to the call. The "Add caller" button can be pressed repeatedly to associate additional users to the call. Once the call is placed, the caller ID information for all the persons present or participating on the call is communicated to the other endpoint device(s). In other words, when the call is presented (i.e., rings) on the callee's phone device, the multiple caller IDs are displayed. The called party may use this information to make an informed decision about whether to answer the call.

Figure 1:
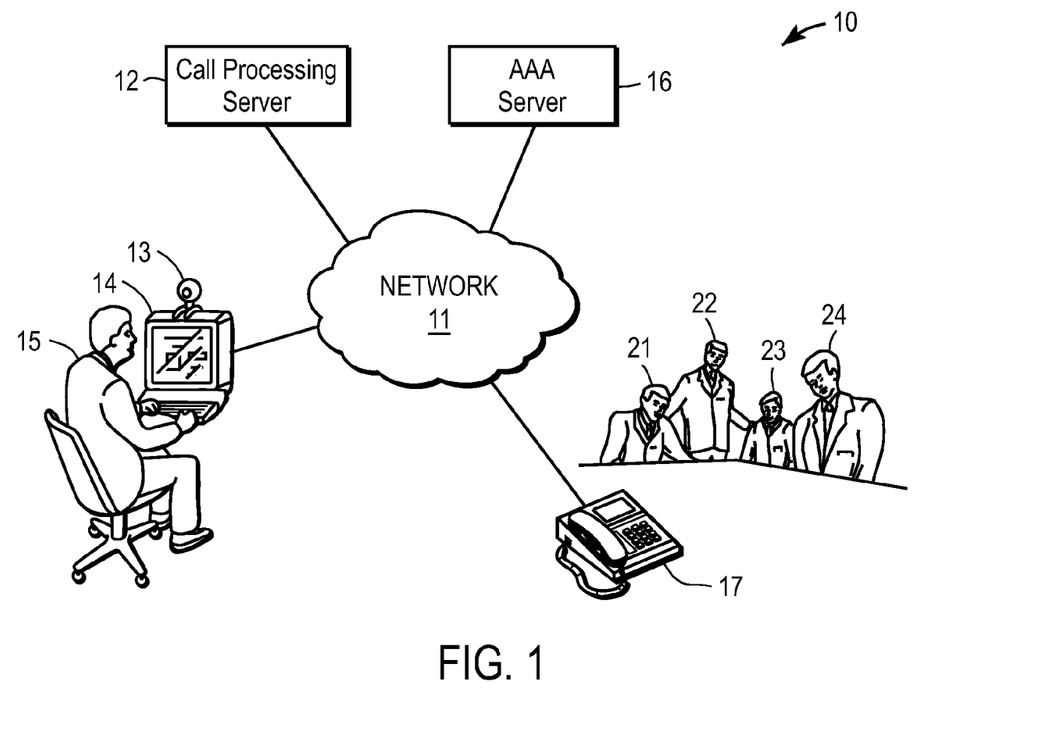
FIG. 1 illustrates an example communications system facilitating a call between two remote endpoint devices.

Referring to FIG. 1, an example communications system 10 is shown that includes a call processing server 12 and an AAA server 16 connected via a network 11 with endpoint devices 14 & 17. Endpoint 14 comprises a personal computer (PC) with built-in telephone communication capabilities. FIG. 1 shows PC 14 associated with a user 15. PC 14 may also be associated with video camera 13 which can be used to facilitate video conferencing. Endpoint 17 is an IP phone located in an office or conference room. A group of individuals (i.e., users 21-24) are shown gathered within listening or speaking range of a phone 17 for the purpose of participating in a conference with user 15.

Call processing server 12 may comprise a software-based callprocessing application, such as a version of Cisco's CallManager™ application, that provides signaling and call control services, distributes calls and features over IP network 11. In certain embodiments, the call processing component or application may reside on or be integrated into a variety of different nodes or devices connected to network 11. For example, the call processing component shown running on server 12 may run on a voice gateway, switch, router, or Private Branch Exchange (e.g., IPPBX) used to facilitate communication amongst endpoints attached to network 11. In still other cases, the call manager function may run on the IP-enabled endpoint or phone devices themselves.

AAA server 16 comprises an authentication server used for network access control, i.e., to authenticate each person present on the call. The authentication function identifies the caller/user, whereas the authorization function implements policies that determine which resources and call services a valid user may access. The authorization function may be utilized, for example, to restrict calls made to certain countries when persons other than high-level managers are present in the room. The accounting function keeps track of time and data resources used, e.g., for purposes of billing and analysis.

In the embodiment shown, when user 21 of phone 17 picks up the handset or otherwise presses the speaker button to place a call to user 15, a GUI or TUI (e.g., an interactive voice response (IVR) system) immediately prompts the other persons present on the call (users 22-24) to individually enter their phone extension number followed by a secret PIN or passcode. This information is then sent to AAA server to authenticate each person for the call. Once authenticated or validated, the call is allowed to connect with the callee's phone, with the caller ID information of users 21-24 is then sent to PC 14 so that user 15 may see the name of each person participating in the conference call. In another embodiment, the system does not prompt the caller to enter the names of the other participants unless the first caller presses the hardware button, or a soft button, "Add Users". In certain embodiments, the caller ID information of all the users may be collectively associated, stored in the IP phone 17 or other device, and communicated to other devices using a composite caller ID value termed a Multi-Party Call ID.

In the example scenario shown, IP phone 17 is an office phone assigned to or associated with user 21 (Mike). User 22 (Joseph) is a Group Director who, along with users 23 & 24 (James & Bob), has stopped by Mike's office to discuss a high priority customer issue. During their discussion they decide to consult with user 15 (Chris), and therefore place a call to him from IP phone 17. Chris, who is busy working on another high priority task, might ordinarily ignore Mike's call and let it be forwarded to his voicemail. But when Chris sees on the screen of PC 14 that the incoming call is from Mike, Joseph, James and Bob, he decides to answer the call.

In addition to manually filtering calls, as described above, automated call filtering functions may be executed by standard call filter engines such as PA (Personal Assistance) systems running on PC 14, or on any other PC or server attached to network 11. Various filters rules can be applied when multiple caller IDs are associated to a call from an endpoint device. For example, Chris may configure a filtering rule on his PC wherein calls from Joseph are always allowed, such that anytime Joseph is present on the call, the call is to be presented. Another possible rule may be to send calls from Mike to voicemail (rather than alert the phone about the incoming call) except when Joseph is present on the call.

In a particular implementation, the GUI/TUI provides the caller with the ability by to re-organize the order of the caller IDs. In the example given above, for instance, the caller ID order may be arranged as Joseph, James, Bob, and Mike before placing the call. The called party, i.e., Chris, may apply different call filtering rules based on the order of the caller ID information. For instance, if the first caller listed is Joseph, or if Joseph is present in first three callers listed, then the call is to be accepted; otherwise, the call is not accepted or is transferred to Chris' voicemail messaging system.

In yet another example embodiment, the system may utilize the directory to automatically arrange the order of the callers alphabetically, in order of their rank, seniority or any other specified criteria.

Figure 2:
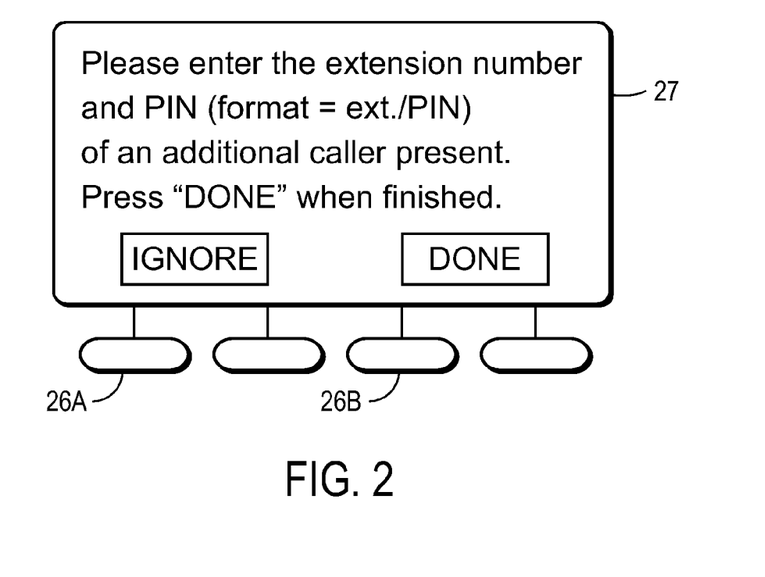
FIG. 2 illustrates an example graphical user interface (GUI) window for the phone shown in FIG. 1.

FIG. 2 illustrates an example GUI window 27 for the IP phone 17 (or PC 14) shown in FIG. 1. Window 27 may be used in conjunction with the phone's softkey buttons (e.g., buttons 26A & 26B) for entering caller ID information of additional persons present on a call. Practitioners in the art will understand that the window 27 may be generated by graphical user interface software (i.e., code) running a user's phone or other endpoint device. In other cases, the GUI may comprise a collaborative web-based application that is accessed by the browser software running on an endpoint. In other instances, the GUI may comprise a downloaded application (e.g., downloaded from server 12) or other forms of computer-executable code that may be loaded or accessed by a user's phone, PC, or other endpoint device. For instance, the software code for implementing the GUI may be executed on server 12 and accessed by a user's phone when the user opens a line (goes "off hook") to place a call.

As can be seen, when a user picks up the telephone handset or otherwise opens a line to place a call (e.g., presses a speakerphone or conference call button), window 27 appears to prompt the user to enter an extension number of an additional person who may be present in the room. If nobody else is present, the user may press softkey button 26A in order to ignore the additional person validation process and simply proceed with the call. Alternatively, if another person (besides the primary caller) is present on the call, the additional caller enters their extension number followed by a secret PIN or passcode that uniquely identifies that individual within the organization.

After entering the information in the requested format (e.g., extension & PIN) the additional caller presses softkey button 26B ("Done") which causes his information to be communicated to AAA server 16 for authentication and authorization. Upon confirmation from the AAA/central server, which includes the standard formatted caller ID information, the caller's phone or endpoint device associates the additional caller ID to the call. A new GUI window may then appear on the display screen of the IP phone giving the user the option to enter the extension number of any additional persons present on the call. That is, the "Add caller" button can be pressed again to repeat above steps to associate additional users to the call. The multiple caller IDs are then displayed on a display screen or monitor of the callee's endpoint device (e.g., PC 14) when the call is finally presented, i.e., when the phone rings. In certain embodiments, the caller ID information of all the users may be collectively associated, stored, and communicated to other devices using the composite caller ID value or Multi-Party Call ID.

In another embodiment, a dedicated "Add Caller" button may be provided on the phone such that GUI window 27 appears on the display screen in response to the "Add Caller" button being pressed.

In another variation of the example embodiment described above, Mike's phone may be associated to his PC, and Joseph, James, and Bob may each utilize Mike's PC to add their caller IDs to the outgoing call. Again, the entered information is sent to AAA server 16 for authentication and authorization purposes. In still another embodiment, Joseph may associate his PC/laptop with Mike's phone device using a wired or wireless (e.g., Bluetooth, 802.11, infrared, etc.) connection. Joseph may then use his own PC/laptop to enter his extension number and PIN information, which is then submitted it AAA server 16 for adding his caller ID to outgoing call.

Figure 3:
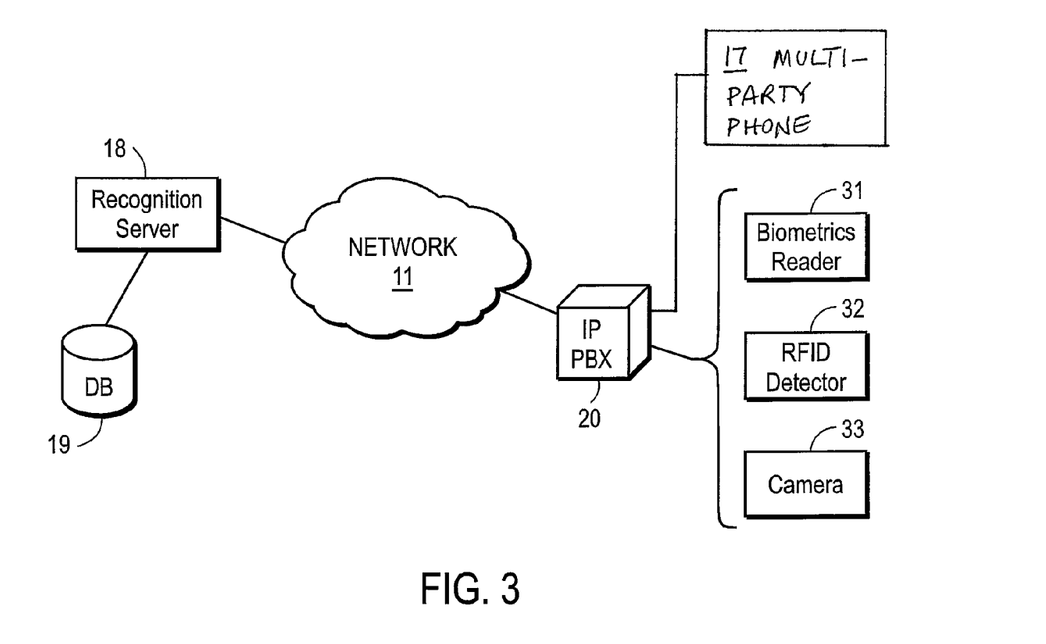
FIG. 3 illustrates an example communications system configured for automatic identification of multiple persons on a call.

Rather than having users manually enter their caller ID information, the identification, authentication, and authorization processes for adding caller IDs to a call may be completely automatic. In other words, manual entering of extension numbers or other caller ID information is unnecessary since one or more recognition or identification systems may be employed to identify, authenticate, and authorize individuals present on a call. By way of example, FIG. 3 illustrates a communications system configured for automatic identification of multiple persons on a call. In the example shown, a number of different devices are shown coupled with an IP-PBX system 20, which, in turn, is shown attached to network 11. The devices include a multi-party phone 17 as described above for FIG. 1, FIG. 2. A recognition server 18 (e.g., an AAA server) is also shown attached to network 11. Recognition server 18 is connected with a database 19 that stores identification and profile information of individuals within the organization. In certain embodiments, the caller ID information of all the users in a particular call, group, or other entity may be collectively associated and stored in the database 19.

In the example of FIG. 3, a biometric reader 31 (e.g., fingerprint reader), RFID detector 33, and a camera 33 are shown coupled with IP-PBX 20 for automatically identifying multiple persons on a call when a user of a phone 17 or other endpoint device goes off hook to place a call. For example, when the user picks up the phone 17 to place a call, a GUI/TUI may prompt the user to have each of the people present in the room scan their fingerprint using a fingerprint reader, or other type of biometric reader device 31.

Alternatively, an RFID detector 31 may be placed in the user's office or conference room (e.g., in the doorway), such that when a call is being placed the RFID detector automatically scans an RFID tag embedded in each person's work badge, mobile phone, laptop, etc. Scanning may also be performed automatically as each person enters the room, with the scanned information being forwarded to an AAA server as part of the call initiation process.

In still another example embodiment the system utilizes a smartcard reader to read a smartcard or ID card (e.g., a work badge) of each person present or close to the originating caller.

Still another possibility is to utilize a camera 33 to capture facial images of each person present in the room prior to a call being placed or connected. Facial recognition technology can be used to recognize the face(s) of the people near the calling device (e.g. video phone) and use that to automatically populate the caller ID with IDs of all the individuals nearby to the calling device. For example, if Joseph, Mike, James and Bob are sitting in Mike's office, when a call is initiated from Mike's office phone, a camera in Mike's office (e.g., mounted on his video phone or PC) captures the facial images of everyone present or close to the originating caller.

Server 18, for example, may include a facial recognition software module that may be used to pick someone's face out of an image, extract that face from the rest of the scene, and compare it to a catalog of facial images stored in database 19. By way of example, a software program such as FaceIt™ sold by Identix, Inc., of Minnetonka, Minn., or facial recognition programs sold by Viisage Technology of Littleton, Mass., may be used to analyze images of human faces for the purpose of identifying them.

Yet another possibility is to utilize a wireless access point in the office or conference room to detect the presence of an employee's laptop computer, PDA, or mobile phone device when a call is being placed. Known triangulation techniques may also be utilized to determine when an individual is present or nearby when a conference call is placed to another party.

Regardless of what type of apparatus is utilized, once the identification information (e.g., fingerprint, facial image, RFID, wireless presence, etc.) of the individuals present on the call has been automatically obtained, it is sent to recognition server 18 for authentication and/or authorization purposes. That is, recognition server 18 may access database 19 to authenticate the identity of each person detected, and also to authorize each person's presence and/or participation on the call. Once everybody present on the call has been identified, authenticated, and/or authorized, the actual call is placed to the called party by IP-PBX system 20. A list of the names and/or other ID information of each person present on the call is then visually provided on a display screen of the called party's endpoint device. In certain embodiments, the caller ID information of all the users may be collectively associated and stored using a composite caller ID value or Multi-Party Call ID in the IP-PBX system 20.

In another example embodiment, the system announces the names of the callers by playing a voice prompt with the callers' names or playing a special tone for each caller.

In one embodiment, the list of names or caller ID information may be displayed to the callee both prior to pickup or answering a call, as well as after the callee has answered the call. This allows the callee to appropriately screen the incoming call and also know who is continually present throughout the duration of the call. For instance, during the call Joseph may walk out of the office or conference room, which event is detected automatically by, say, RFID detector 32. At that point, a list of names displayed on the called party's endpoint device is automatically updated in real-time, such that Joseph's name is no longer listed as being present on the call. In this manner, the callee always knows the names or caller IDs of everyone who is currently present on the call. In a particular implementation, a log of the persons present on the conference call may be stored in a database for recordkeeping or archival purposes. Additionally, the called party's endpoint device may generate an alert message (visual, audible, text, etc.) notifying the callee of the change in who is currently present on the conference call.

Figure 4:
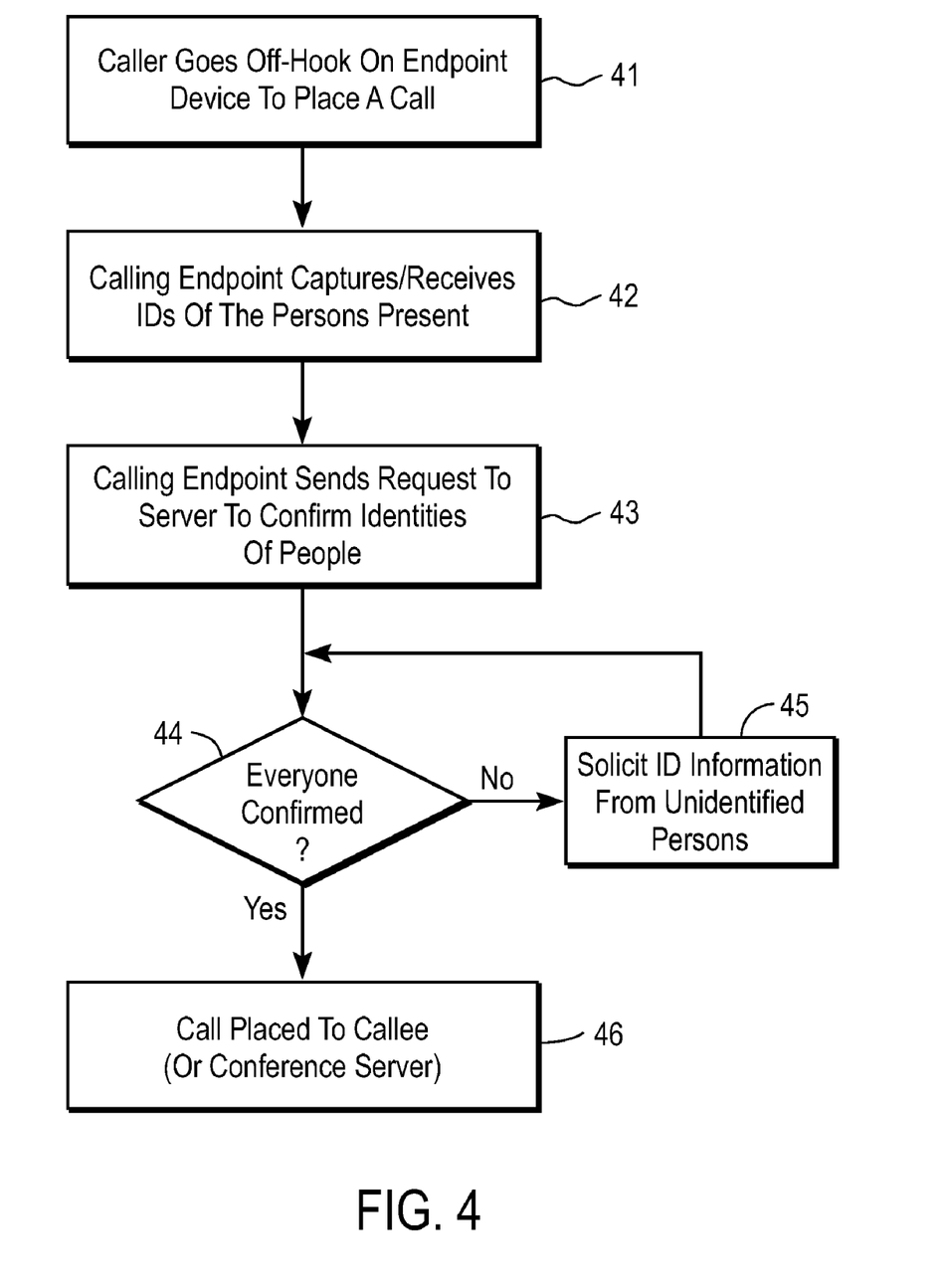
FIG. 4 illustrates an example method of operation for a system configured for communicating caller IDs of multiple persons on a call to a called party.

FIG. 4 illustrates an example method of operation for a system configured for communicating caller IDs of multiple persons on a call to a called party. The process begins with the user/caller going off-hook on his endpoint device in order to place a call to another party (e.g., person-to-person) or to a conferencing server or other device used to register multiple callers to a conference call (block 41). Prior to the call being connected to the callee, the system either automatically captures the ID information from each person present on the call, or prompts the caller to have each person present on the call enter their extension number & PIN information, as described above. This step is shown occurring in block 42. This information is then sent or forwarded from the calling endpoint to a recognition and/or AAA server (block 43). The server may be utilized to confirm the identities of each person present on the call, as well as to authenticate and authorize their attendance/participation on the call.

Once everyone present on the call has been authorized or confirmed (block 44), the call is placed to the callee's endpoint device or conferencing server handling the call (block 46). In the event that an unidentified person is detected as being present, the system may solicit certain ID information prior to connecting the call. For example, an outside vendor or contractor (Ed) may be present in the originating caller's office and the system's database may not have an entry or record of that person. In such a case, the GUI/TUI may ask Ed to identify his company or firm, his full name, and other information prior to connecting the call (block 45). In the case of unidentified individuals, the originating call may also be asked to specifically authorize that person's presence on the call.

Figure 5:
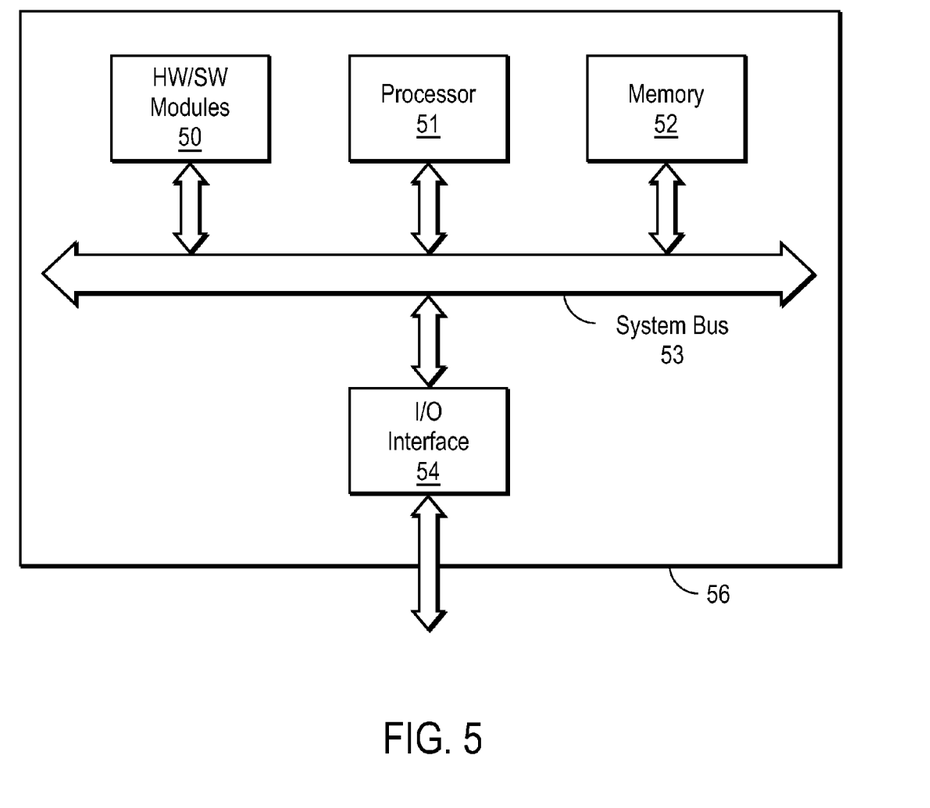
FIG. 5 illustrates an example network node or device.

FIG. 5 is a generalized block diagram showing an example network device or node 56, such as may comprise any of the systems, devices, or nodes (e.g., a PC or server) shown or described above. Node 56 includes a processor subsystem 51 coupled with a memory unit 52, one or more hardware/software modules 50, and an input/output (I/O) interface 54 via a system bus 53. Modules 50 may include software, firmware, or logic embedded in hardware for implementing any of the functions described herein, e.g., those functions associated including adding multiple caller IDs to a call, etc. In one example implementation, bus 53 may be replaced with a high-speed network (e.g., network 11 in FIG. 1) and the components mentioned above are distributed, attached to and communicate through the high-speed network.

It is appreciated that any caller ID system utilized by or in conjunction with node 56 may comprise separate hardware devices coupled to the system bus 53, or, alternatively, implemented as software programs or modules 50 that run on one or more processors of subsystem 51. In other words, the various functions described above may be implemented as separate hardware devices, memory locations (storing executable code), firmware devices, software modules, or other machine-readable devices. (In the context of the present application, therefore, the term "module" is to be understood as being synonymous with both hardware devices and computer-executable software code, programs or routines.)

It should be further understood that elements of the present invention may also be provided as a computer program product which may include a machine-readable medium having stored thereon instructions which may be used to program a computer (e.g., a processor or other electronic device) to perform a sequence of operations. Alternatively, the operations may be performed by a combination of hardware and software. The machine-readable medium may include, but is not limited to, floppy diskettes, optical disks, CD-ROMs, and magneto-optical disks, ROMs, RAMs, EPROMs, EEPROMs, magnet or optical cards, propagation media or other type of media/machine-readable medium suitable for storing electronic instructions. For example, elements of the present invention may be downloaded as a computer program product, wherein the program may be transferred from a remote computer or telephonic device to a requesting process by way of data signals embodied in a carrier wave or other propagation medium via a communication link (e.g., a modem or network connection).

Memory 52 may comprise a main memory, such as a random access memory (RAM) or other dynamic storage device, coupled to the bus 53 for storing information and instructions to be executed by processor 51. Main memory 52 also may be used for storing temporary variables or other intermediate information during execution of instructions to be executed by processor 51. Computer system 56 further may include a read only memory (ROM) or other static storage device coupled to bus for storing static information and instructions for processor 51. A storage device, such as a magnetic disk or optical disk, may be coupled to bus 53 for storing information and instructions.

Computer system 56 may be coupled via bus 53 to a display, such as a cathode ray tube (CRT), for displaying information to a computer user. An input device, including alphanumeric and other keys, is coupled to bus 53 for communicating information and command selections to processor 51. Another type of user input device is a cursor control, such as a mouse, a trackball, or cursor direction keys for communicating direction information and command selections to processor 51 and for controlling cursor movement on the display. This input device typically has two degrees of freedom in two axes, a first axis (e.g., x) and a second axis (e.g., y), that allows the device to specify positions in a plane.

The invention is related to the use of computer system 56 for implementing the techniques described herein. According to one embodiment of the invention, those techniques are performed by computer system 56 in response to processor 51 executing one or more sequences of one or more instructions contained in main memory. Such instructions may be read into memory 52 from another machine-readable medium, such as a storage device. Execution of the sequences of instructions contained in memory 52 causes processor 51 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 56, various machine-readable media are involved, for example, in providing instructions to processor 51 for execution. Such a medium may take many forms, including non-volatile storage media and volatile storage media. Non-volatile media includes, for example, optical or magnetic disks. Volatile media includes dynamic memory, such as memory 52. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 51 for execution. For example, the instructions may initially be carried on a magnetic disk of a remote computer. The remote computer can load the instructions into its dynamic memory and send the instructions over a telephone line using a modem. A modem local to computer system 56 can receive the data on the telephone line and use an infra-red transmitter to convert the data to an infra-red signal. An infra-red detector can receive the data carried in the infra-red signal and appropriate circuitry can place the data on bus 53. Bus 53 carries the data to memory 52, from which processor 51 retrieves and executes the instructions. The instructions received by memory 52 may optionally be stored on a storage device either before or after execution by processor 51.

Computer system 56 also may include a communication interface coupled to bus 53 to provide a two-way data communication coupling to a network link that is connected to a local network. For example, the communication interface may be an integrated services digital network (ISDN) card or a modem to provide a data communication connection to a corresponding type of telephone line. As another example, the communication interface may be a local area network (LAN) card to provide a data communication connection to a compatible LAN. Wireless links may also be implemented. In any such implementation, communication interface sends and receives electrical, electromagnetic or optical signals that carry digital data streams representing various types of information.

The network link typically provides data communication through one or more networks to other data devices. For example, the network link may provide a connection through the local network to a host computer or to data equipment operated by an Internet Service Provider (ISP). The ISP in turn provides data communication services through the world wide packet data communication network now commonly referred to as the "Internet". The local network and the Internet both use electrical, electromagnetic or optical signals that carry digital data streams. The signals through the various networks and the signals on the network link and through the communication interface, which carry the digital data to and from computer system 56, are exemplary forms of transporting the information.

Computer system 56 can send messages and receive data, including program code, through the network(s), the network link and the communication interface. In the Internet example, a server might transmit a requested code for an application program through Internet, the ISP, the local network and the communication interface. The received code may be executed by processor 51 as it is received, and/or stored in the storage device, or other non-volatile storage for later execution.

3.0 Treatment of Multi-Party Calls in a Contact Center

In various embodiments, techniques are provided for customer service centers, call processing locations, or other call contact centers to provide services to customers or other callers based on information about multiple calling parties involved in a call. In various embodiments, the contact centers can provide differentiated services to a call based on the parties involved and their weighted average priority or other factors. In various embodiments, the approaches herein can be configured:

- To provide contact centers with a mechanism to differentiate between multi-party and single-party calls, by using a Multi-Party Caller ID.
- To calculate a collective priority based of the profile of each person in the Multi-Party Caller ID of the given call.
- To calculate a collective profile based on the Multi-Party Caller ID.
- To display to a call handling agent a screen pop comprising collective data that has been determined based on the Multi-Party Caller ID.
- To provide appropriate customer service for calls coming from a group of people.
- To process a mid-call update to the Multi-Party Caller ID to adjust the call priority and associated services when a new party joins or leaves the call.

Embodiments may be used in a variety of call center products and solutions. For example, embodiments may be integrated into products such as the Cisco Unified Communications Contact Center, commercially available from Cisco Systems, Inc., San Jose, Calif. Other embodiments may be implemented in general-purpose computers that have telephone interfaces, private branch exchange (PBX) equipment, voice-over-Internet Protocol (VoIP) call managers or servers, and other platforms. The term "contact center" refers broadly to any location in which call processing equipment is located.

Figure 6:
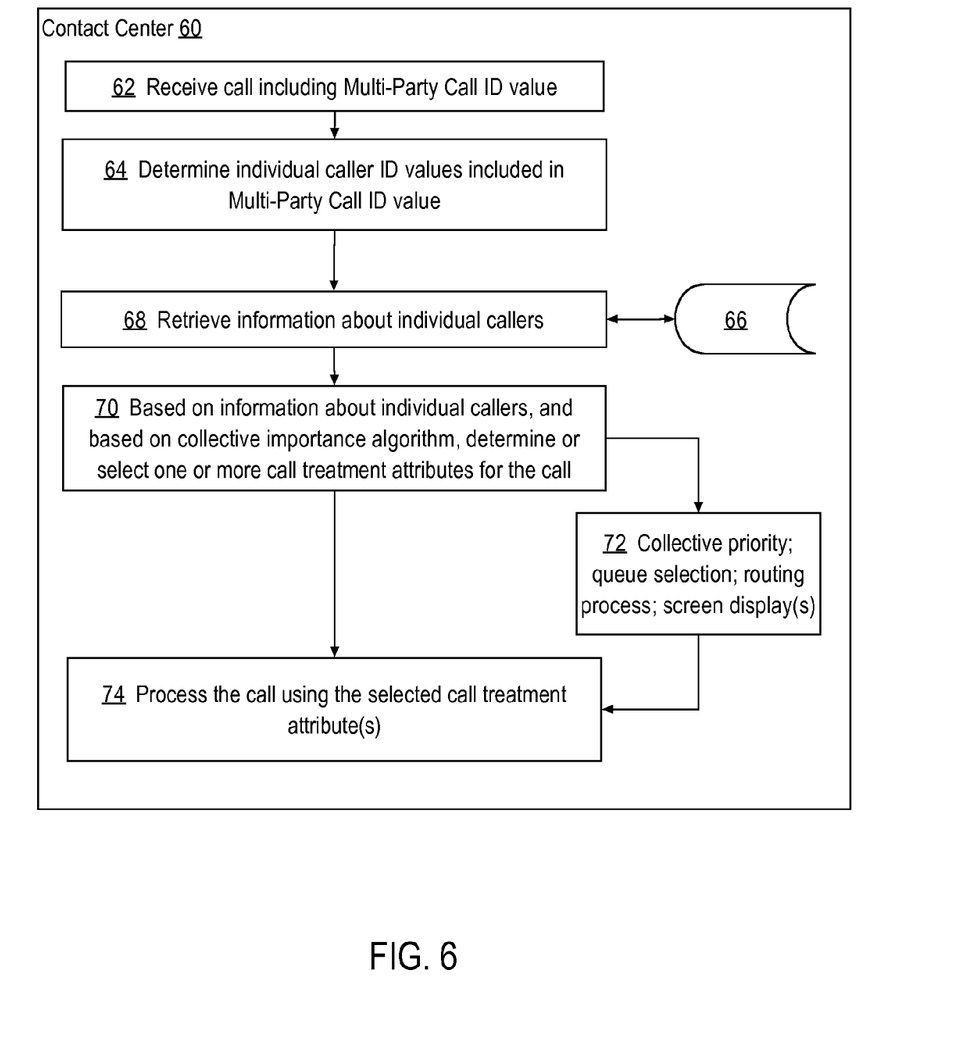
FIG. 6 illustrates determining call treatment attributes for a call based on a multi-party caller identification value.

3.1 Determining Call Treatment Attributes Based on a Multi-Party Caller Identification Value FIG. 6 illustrates determining call treatment attributes for a call based on a multi-party caller identification value. In an embodiment, a contact center 60 comprises a call processor or call server having logic, stored program instructions, or a combination thereof that implement the functions described in this section.

In an embodiment, at block 62, a call is received that includes a Multi-Party Call ID value. For example, assume that a caller named Joseph is calling an airline in the presence of other individuals named Laurent, Mukul and Sanjeev, all of whom want to make a reservation for a trip together. In an embodiment, using the techniques described above in section 2.0, multiple parties may be associated to a call and identified in a composite caller identification value termed a Multi-Party Call ID value. As stated in section 2.0, the Multi-Party Call ID value can be established based on multiple callers using same phone and then individually authenticating with a AAA server, the parties may form a conference call between them and then call the contact center.

As part of block 62, the contact center 60 receives the Multi-Party Call ID value together with the call from Joseph, and the Multi-Party Call ID value indicates that the call is from all four people together. In an embodiment, a call management unit that is handling the callers sends a Call Info message to a call handling computer at the Contact Center 60, and the Call Info message contains the Multi-Party Call ID value. In an embodiment, the call management unit is Cisco Call Manager, commercially available from Cisco Systems, Inc. In various embodiments, the call management unit and the call handling computer may comprise PBX units, VoIP computers, etc. The Call Info message and other communications between the Call Manager and the Contact Center 60 may conform to the Java Telephony application programming interface (JTAPI) standard, Session Initiation Protocol (SIP) with extended headers, or other protocols.

In block 64, one or more individual caller ID values contained in the Multi-Party Call ID value are determined. Block 64 can involve separating concatenated values, extracting values from a list of name-value pairs, or other techniques to separate individual values from a multi-value data structure.

Based on the received values, in an embodiment, the Contact Center 60 can determine a priority for the call taking into account each of the people represented by the Multi-Party Call ID value. For example, as shown in block 68, the Contact Center can retrieve information from a database 66 or knowledge base about each of Joseph, Mukul, Laurent, and Sanjeev using each of their caller ID values that are embedded in the Multi-Party Call ID value.

In block 70, based on the information about the individual callers, and based on a collective importance algorithm, one or more call treatment attributes for the call are determined or selected. For example, the Contact Center calculates a priority of the call based on the collective importance of the four callers; the collective priority value is then used in the treatment of the call as seen in block 74. For example, the call is placed in a call handling queue ahead of other calls having lower Collective Priority values. The collective importance algorithm, for example, can give greater weight to customers who have high call volume or who are known to have purchased a large quantity, volume or amount of products or services. Additionally or alternatively, the number of transactions that the callers have undertaken, bank balances, or any other data retrieved at block 68 can be considered. For example, if four persons are calling a credit card customer service center, and two of the parties are Gold Card holders, the group of four might be given a higher priority than another group of callers comprising zero Gold Card holders.

The collective importance algorithm can comprise a weighted average of values associated with each individual caller. A summation function, maximum function, or other weighting or combining techniques may be used. In an embodiment, the Collective Priority is determined according to logic that is configurable or programmable by an administrator or other individual associated with the Contact Center 60. The particular mechanism that is used to determine the Collective Priority is not critical to the embodiments herein.

Additionally or alternatively, as shown in block 72, the call treatment attributes can affect selection of a particular call handling queue from among a plurality of available queues, or can determine how the call is routed to one or more call handling agents, or can be used to determine what information to display in one or more screen displays that are used by call handling agents to process the call. In step 74, the call is processed or handled based on the determined or selected call handling attributes.

3.2 Determining a Collective Profile

Figure 7:
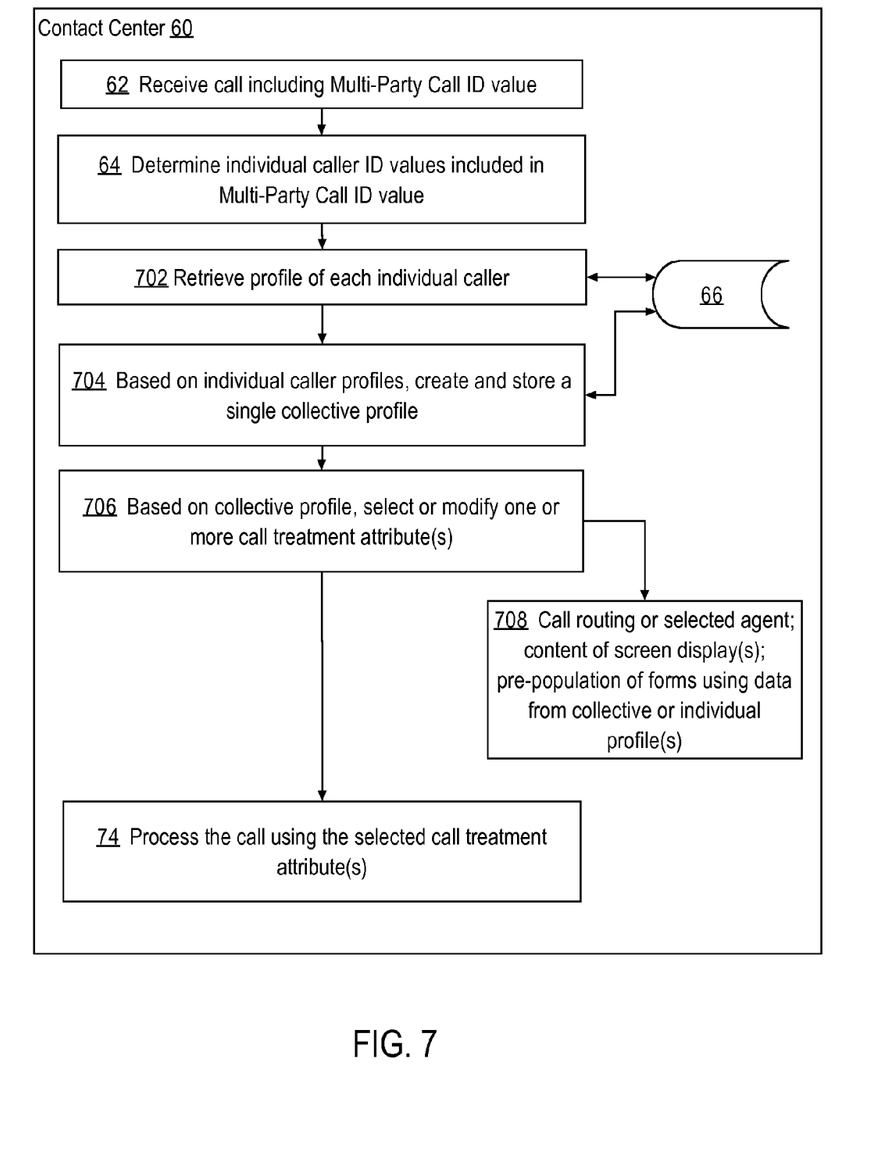
FIG. 7 illustrates determining a collective profile for multiple callers based on a multi-party caller identification value.

FIG. 7 illustrates determining a collective profile for multiple callers based on a multi-party caller identification value. Block 62 and block 64 comprise the functions described above for FIG. 6. In block 702, based on the individual caller ID values obtained from the Multi-Party Call ID value, one or more caller profiles are retrieved from the database 66. A profile of a caller may comprise descriptive information about a caller, including preferences, past transaction history, demographic data, etc. In block 704, a collective profile is created and stored in database 66.

In block 706, based on the collective profile, one or more call treatment attributes are determined or selected. As shown in block 708, the call treatment attributes may include a particular call routing, selection of a particular call handling agent, determining the contents of screen displays, or pre-populating forms using data in the collective profile or in one or more individual profiles.

In an embodiment, a Collective Profile consolidates in a single record the profiles of everyone on the call. The Collective Profile can be used in selecting a call handling agent, or to select a group of agents from which a call handling agent is then selected, for purposes of receiving and handling or processing the call. For example, if two parties among the four parties speak English and two parties speak French, then the Contact Center may create a collective profile that identifies both English and French, and in response, logic in the Contact Center would route the call to a call handling agent fluent in either or both languages.

In another example, when four people call together to book airline tickets for traveling together as a group, the call center agent handling the reservation may have simultaneous access to traveler profiles of each party in the call. In an embodiment, the Contact Center logic can also automatically populate information in call handling forms, such as automatically storing the name, address, and related information of each party on the call in an air ticket booking record with which the call center agent is working.

Thus, a Collective Profile may comprise a summary, summation, or consolidation of profile information for all parties on a call. Additionally or alternatively, logic in the Contact Center 60 is configured to enable a call handling agent to retrieve or view an individual profile of each calling party on the call, for example, after viewing the Collective Profile. Because the Multi-Party Call ID value comprises individual caller ID values, the logic can retrieve individual profiles from the database 66 based on the individual caller ID values. As a result, the call handling agent can interact with the logic in the Contact Center 60 to "drill down" to more detailed information about one or more individual callers, as appropriate.

For example, if two parties are collectively calling a credit union call center and jointly applying for a vehicle loan, the credit union call center's application programs may determine an interest rate for the loan based on a Collective Profile that averages credit scores of the two callers. However, if one party informs the call handling agent that the proposed interest rate is too high, the call handling agent could inspect the credit scores of the callers separately or individually by retrieving individual profiles, and inform the callers, for example, that a particular one of the callers has a credit history issue that is driving the offered interest rate. Similarly, after initially viewing a Collective Profile showing a combined credit union account balance of both callers, the call handling agent might select, in a graphical user interface of the call center's application programs, one of the callers and view an individual account balance for that person.

3.3 Generating Visual Displays with Collective Information

Figure 8:
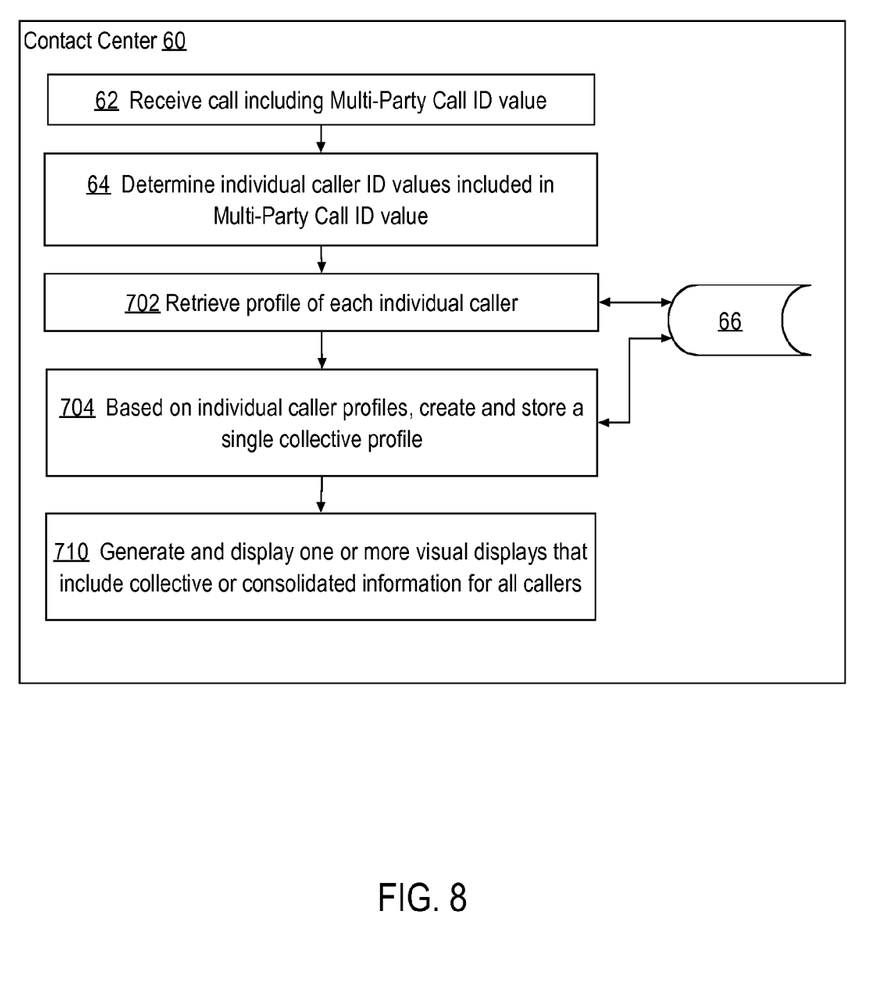
FIG. 8 illustrates generating visual displays that include collective or consolidated information for all callers, based on a multi-party caller identification value.

FIG. 8 illustrates generating visual displays that include collective or consolidated information for all callers, based on a multi-party caller identification value.

Blocks 62, 64, 66, 702, and 704 provide the functions described above for FIG. 7. Block 710 comprises generating and displaying one or more visual displays that include collective or consolidated information for all callers on the call.

In an embodiment, an application program hosted in the Contact Center 60 generates screen pop information, relating to callers in calls handled by the system, to call handling agents on the computer displays of computers used by the call handling agents. In an embodiment, the screen pop information that is displayed to the agent handling the call shows the collective information of all parties. For example, in various embodiments an identification of a common spoken language is displayed, the total net worth of all callers is displayed, collective preferences are displayed, etc. Such collective information may comprise a union of all individual information that is known about the callers.

Additionally or alternatively, the Contact Center can display one or more screen pops, windows or other displays that comprise individual information for each different party who is on the call. For example, if three friends are applying together for a vehicle loan over the phone, the call handling agent may receive a display of the combined net worth of all the callers-applicants even though each individual applicant may be unaware of the net worth of another co-applicant or unwilling to share an individual net worth value with other co-applicants.

3.4 Updating Call Treatment Attributes Based on Mid-Call Updates

Figure 9:
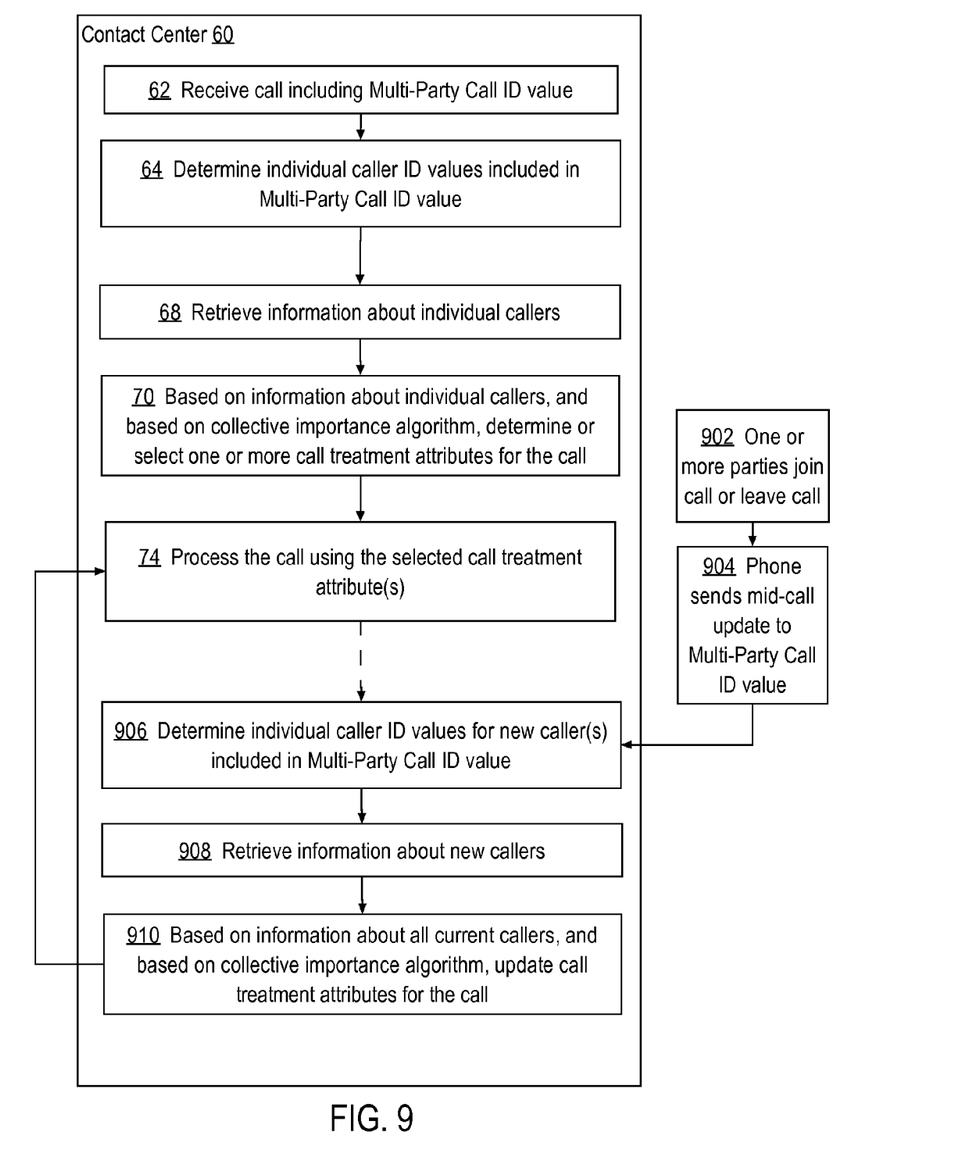
FIG. 9 illustrates updating call treatment attributes based on receiving a mid-call update to a multi-party caller identification value.

FIG. 9 illustrates updating call treatment attributes based on receiving a mid-call update to a multi-party caller identification value. Additional parties can join in the middle of a call, a process termed mid-call party addition, either by conferencing in or by authenticating additional parties from the same phone device. One or more parties also may leave a call in mid-call. In an embodiment, joining and dropping out from the call triggers a mid-call update to the Multi-Party Call ID value and providing the updated value to the Contact Center. In response, contact center systems can adjust the call priority, queuing, routing, or screen pop-up functionality for that call based on the change in the number and identity of the parties on the call.

In FIG. 9, blocks 62, 64, 68, 70, and 74 function as described above for FIG. 1. At some point during processing of blocks 62, 64, 68, 70, or 74, one or more parties join the call or leave the call, as shown in block 902. In an embodiment, an IP phone, which one of the remaining parties is using, re-computes the Multi-Party Call ID value using any of the techniques described above in section 2.0, and sends a mid-call update comprising a new Multi-Party Call ID value to the Call Center. For example, a PBX unit or call management unit handling the callers sends a Call Info message to a PBX unit or other call handling computer system of the Contact Center 60 and provides the updated Multi-Party Call ID value.

In step 906, one or more individual caller ID values are determined for the callers represented in the updated Multi-Party Call ID value. Block 906 may be implemented in the same manner as block 64, as described above, except that the updated Multi-Party Call ID value received in the mid-call update is considered.

In block 908, information about the new callers represented in the updated Multi-Party Call ID value is retrieved from database 66 or a similar source. In block 910, based on information about all the current callers, and based on the collective importance algorithm referenced above in block 70, one or more call treatment attributes for the call are updated. For example, call priority, queuing, routing, or screen pop data may change. If the call is already being handled by a call handling agent at the time of an update, then subsequent call priority, queuing, routing or screen pop data might change.

4.0 Extensions and Alternatives

Additionally, although the present invention has been described in conjunction with specific embodiments, numerous modifications and alterations are well within the scope of the present invention. For instance, although functions and methods of various embodiments have been described as being embodied on a call processing or recognition server, it is appreciated that these same methods and functions may be embodied on an endpoint device of a user, another server (e.g., a conferencing sever), a call processing application running on a different client device, or a third party service application program accessible via a web-based browser.

Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A data processing apparatus comprising:
   a network interface that is configured to couple to a voice call network for receiving one or more voice calls therefrom;
   one or more processors;
   one or more stored sequences of instructions which, when executed by the processor, cause the processor to perform:
   receiving a call, at a contact center, comprising multiple callers who are identified in a multi-party caller identification value that is received with the call;
   retrieving from a database, based on the multi-party caller identification value, information about each of the multiple callers;
   based on the retrieved information and a collective importance algorithm, determining or selecting one or more call treatment attributes for the call;
   processing the call using the one or more call treatment attributes that are determined or selected;
   routing the call to a particular call handling agent in the contact center based on the call treatment attributes.

2. The apparatus of claim 1, further comprising sequences of instructions which, when executed by the processor, cause the processor to perform determining two or more individual caller identification values that are included in the multi-party caller identification value, wherein each of the individual caller identification values is uniquely associated with one of the multiple callers.

3. The apparatus of claim 1, wherein the sequences of instructions that cause the processor to perform determining or selecting comprise sequences of instructions which, when executed by the processor, cause the processor to perform determining or selecting a collective priority value for the call, selecting a particular queue for the call based on the call treatment attributes, or generating one or more screen display content elements based on the call treatment attributes.

4. The apparatus of claim 1, further comprising sequences of instructions which, when executed by the processor, cause the processor to perform retrieving a plurality of individual caller profiles from the database for the multiple callers, creating and storing a collective profile based on the plurality of individual caller profiles, and determining, selecting or modifying one or more of the call treatment attributes based on the collective profile.

5. The apparatus of claim 4, wherein the call treatment attributes comprise any of a call routing, a selected call handling agent, content of one or more screen displays, and data for populating one or more forms.

6. The apparatus of claim 4, further comprising sequences of instructions which, when executed by the processor, cause the processor to perform generating and displaying one or more visual displays that include one or more content elements that are based on the collective profile.

7. The apparatus of claim 1, further comprising sequences of instructions which, when executed by the processor, cause the processor to perform receiving, during the call, an updated multi-party caller identification value; retrieving from the database, based on the updated multi-party caller identification value, updated information about each of the multiple callers; based on the retrieved updated information and the collective importance algorithm, determining or selecting one or more updated call treatment attributes for the call; processing the call using the one or more updated call treatment attributes that are determined or selected.

8. A non-transitory computer-readable storage medium storing one or more sequences of instructions, which instructions, when executed by one or more processors, cause the one or more processors to perform:
   receiving a call, at a contact center, comprising multiple callers who are identified in a multi-party caller identification value that is received with the call;
   retrieving from a database, based on the multi-party caller identification value, information about each of the multiple callers;
   based on the retrieved information and a collective importance algorithm, determining or selecting one or more call treatment attributes for the call;
   processing the call using the one or more call treatment attributes that are determined or selected;
   routing the call to a particular call handling agent in the contact center based on the call treatment attributes.

9. The computer-readable medium of claim 8, further comprising sequences of instructions which, when executed by the processor, cause the processor to perform determining two or more individual caller identification values that are included in the multi-party caller identification value, wherein each of the individual caller identification values is uniquely associated with one of the multiple callers.

10. The computer-readable medium of claim 8, wherein the sequences of instructions that cause the processor to perform determining or selecting comprise sequences of instructions which, when executed by the processor, cause the processor to perform determining or selecting a collective priority value for the call, selecting a particular queue for the call based on the call treatment attributes, or generating one or more screen display content elements based on the call treatment attributes.

11. The computer-readable medium of claim 8, further comprising sequences of instructions which, when executed by the processor, cause the processor to perform retrieving a plurality of individual caller profiles from the database for the multiple callers, creating and storing a collective profile based on the plurality of individual caller profiles, and determining, selecting or modifying one or more of the call treatment attributes based on the collective profile.

12. The computer-readable medium of claim 11, wherein the call treatment attributes comprise any of a call routing, a selected call handling agent, content of one or more screen displays, and data for populating one or more forms.

13. The computer-readable medium of claim 11, further comprising sequences of instructions which, when executed by the processor, cause the processor to perform generating and displaying one or more visual displays that include one or more content elements that are based on the collective profile.

14. The computer-readable medium of claim 8, further comprising sequences of instructions which, when executed by the processor, cause the processor to perform receiving, during the call, an updated multi-party caller identification value; retrieving from the database, based on the updated multi-party caller identification value, updated information about each of the multiple callers; based on the retrieved updated information and the collective importance algorithm, determining or selecting one or more updated call treatment attributes for the call; processing the call using the one or more updated call treatment attributes that are determined or selected.

15. A computer-implemented method comprising:
receiving a call, at a contact center, comprising multiple callers who are identified in a multi-party caller identification value that is received with the call;
retrieving from a database, based on the multi-party caller identification value, information about each of the multiple callers;
based on the retrieved information and a collective importance algorithm, determining or selecting one or more call treatment attributes for the call;
processing the call using the one or more call treatment attributes that are determined or selected;
routing the call to a particular call handling agent in the contact center based on the call treatment attributes;
wherein the method is performed by one or more computing devices.

16. The method of claim 15, further comprising determining two or more individual caller identification values that are included in the multi-party caller identification value, wherein each of the individual caller identification values is uniquely associated with one of the multiple callers.

17. The method of claim 15, further comprising determining or selecting a collective priority value for the call, selecting a particular queue for the call based on the call treatment attributes, or generating one or more screen display content elements based on the call treatment attributes.

18. The method of claim 15, further comprising retrieving a plurality of individual caller profiles from the database for the multiple callers, creating and storing a collective profile based on the plurality of individual caller profiles, and determining, selecting or modifying one or more of the call treatment attributes based on the collective profile.

19. The method of claim 18, wherein the call treatment attributes comprise any of a call routing, a selected call handling agent, content of one or more screen displays, and data for populating one or more forms.

20. The method of claim 18, further comprising generating and displaying one or more visual displays that include one or more content elements that are based on the collective profile.

21. The method of claim 8, further comprising receiving, during the call, an updated multi-party caller identification value; retrieving from the database, based on the updated multi-party caller identification value, updated information about each of the multiple callers; based on the retrieved updated information and the collective importance algorithm, determining or selecting one or more updated call treatment attributes for the call; processing the call using the one or more updated call treatment attributes that are determined or selected.

22. A data processing apparatus comprising:
a network interface that is configured to couple to a voice call network for receiving one or more voice calls therefrom;
one or more processors;
one or more stored sequences of instructions which, when executed by the processor, cause the processor to perform:
receiving a call, at a contact center, comprising multiple callers who are identified in a multi-party caller identification value that is received with the call;
retrieving from a database, based on the multi-party caller identification value, a plurality of individual caller profiles from the database for the multiple callers;
creating and storing a collective profile based on the plurality of individual caller profiles;
determining, selecting or modifying one or more call treatment attributes for the call based on the collective profile;
processing the call using the one or more call treatment attributes that are determined or selected;
routing the call to a particular call handling agent in the contact center based on the call treatment attributes.

23. The apparatus of claim 22, wherein the call treatment attributes comprise any of a call routing, a selected call handling agent, content of one or more screen displays, and data for populating one or more forms.

24. The apparatus of claim 22, further comprising sequences of instructions which, when executed by the processor, cause the processor to perform generating and displaying one or more visual displays that include one or more content elements that are based on the collective profile.

25. A non-transitory computer-readable storage medium storing one or more sequences of instructions, which instructions, when executed by one or more processors, cause the one or more processors to perform:
receiving a call, at a contact center, comprising multiple callers who are identified in a multi-party caller identification value that is received with the call;
retrieving from a database, based on the multi-party caller identification value, a plurality of individual caller profiles from the database for the multiple callers;
creating and storing a collective profile based on the plurality of individual caller profiles;
determining, selecting or modifying one or more call treatment attributes for the call based on the collective profile;
processing the call using the one or more call treatment attributes that are determined or selected;
routing the call to a particular call handling agent in the contact center based on the call treatment attributes.

26. The computer-readable storage medium of claim 25, wherein the call treatment attributes comprise any of a call routing, a selected call handling agent, content of one or more screen displays, and data for populating one or more forms.

27. The computer-readable storage medium of claim 25, further comprising sequences of instructions which, when executed by the processor, cause the processor to perform generating and displaying one or more visual displays that include one or more content elements that are based on the collective profile.

* * * * *